Jan. 31, 1956   R. E. WARREN ET AL   2,733,289
BUS BAR SUPPORT
Filed Aug. 2, 1951
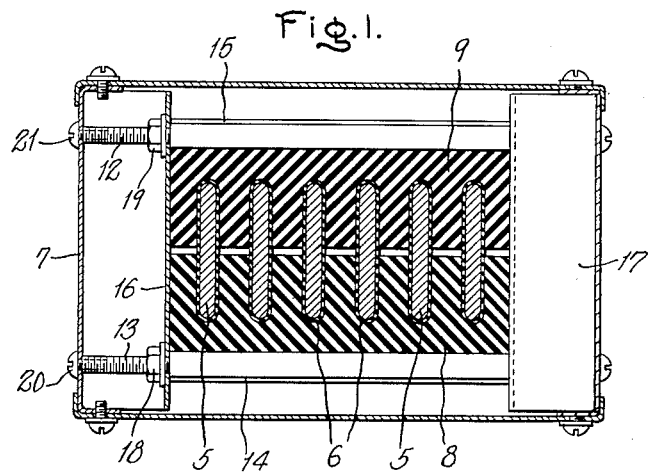
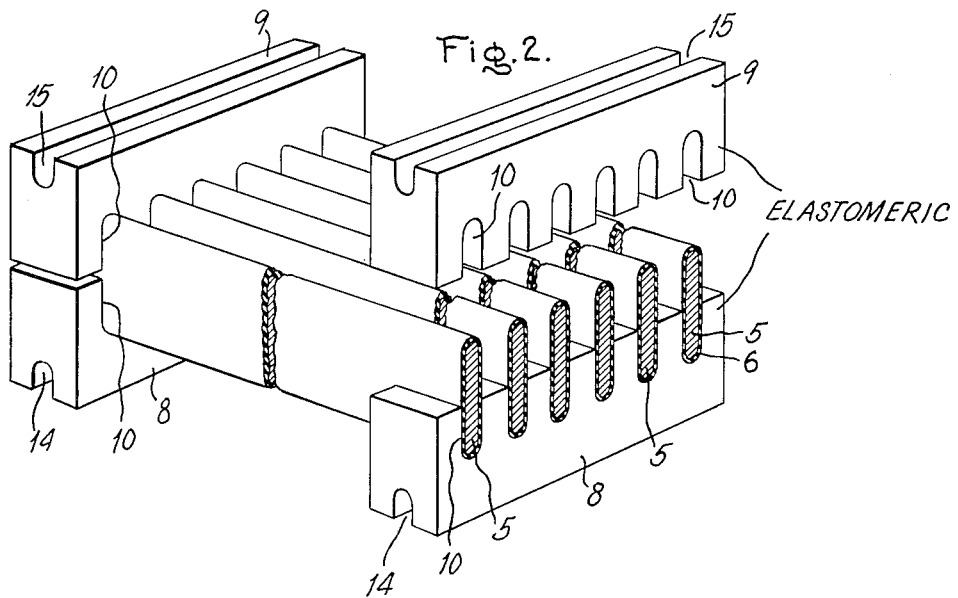
Inventors:
Robert E. Warren,
Wilfred H. Yeamans,
by
Their Attorney.

United States Patent Office 2,733,289
Patented Jan. 31, 1956

2,733,289

BUS BAR SUPPORT

Robert E. Warren, Marblehead, Mass., and Wilfred H. Yeamans, Plainville, Conn., assignors to General Electric Company, a corporation of New York Application August 2, 1951, Serial No. 239,933

2 Claims. (Cl. 174—99)

Our invention relates to bus bar duct systems of power distribution and particularly to the means or method of supporting a number of bus bars in the duct.

One object is to provide a simple, compact and effective means for supporting a plurality of bus bars in a duct system.

Another object is to provide a system of distribution having a low reactance characteristic.

Another object is to provide means for supporting the bus bars in such a way that the system will not become overheated.

Another object is to provide supports which are unlikely to be broken in transportation and in use.

Another object is to provide supports that can be readily manufactured at low cost.

In carrying out the invention, we provide for the support of multiple bus bars at intervals along the length of the duct by elastomeric clamping devices.

Fig. 1 is a cross-sectional view of the bus bar duct with supporting means for bus bars.

Fig. 2 is a fragmentary perspective view showing parts of typical improved supports, parts being shown disassembled.

It should be understood that the bus bars 5, 5 may be of any suitable construction and that each of the bus bars is coated or covered with insulating material 6 of a suitable character. The bus bars may be individually insulated or coated or a number of them embedded in insulating material.

The duct or housing 7 for the bus bars may be of any suitable character. At intervals along the length of the duct, insulating complementary transverse supporting members 8 and 9 are provided extending transversely across the edges of the bus bars, each member having a groove 10 in which substantially one-half of the bus bar is mounted.

In the form shown, these insulating members are positioned by tie rods such as 12 and 13 which fit within the longitudinal grooves 14 and 15, respectively, in the top of the member 8 and bottom of the member 9. These insulating members 8 and 9 are compressed between the vertical walls of channel-like posts or end supports 16 and 17. Each of the rods 12 and 13 extends through apertures in the end supports 16 and 17 and carries clamp nuts 18 and 19 respectively, and each rod is secured to a side of the duct by screws such as 20 and 21 respectively.

It will thus be seen that the bus bars are supported directly by the elastomeric cross members 8 and 9. These insulating cross members are made of any suitable material having elastomeric properties, such as polyvinyl plastisol.

As shown in the drawing, the transverse grooves 10 in each of the supporting and clamping members 8 and 9 have each a depth substantially equal to one-half the width or vertical dimension of the bus bars, as viewed in the drawing, thereby to provide spacing portions of elastomeric material between the bus bars and on the outer sides of the two outer bus bars. The tie rods and nuts 18 and 19 serve to compress the supporting members 8 and 9 longitudinally on and between the flatwise parallel spaced bus bars so as to provide a support for the bus bars which has substantial rigidity even though the members 8 and 9 are made of an elastomeric material.

It has been found that these insulating cross supports may be readily manufactured by molding or by extruding the material and chopping off sections forming individual insulators.

This construction has been found to be much less expensive than the prior art devices. In fact such construction has been found to save close to 50% in cost of construction.

The provision of a resilient or elastic insulator has definite advantages in avoiding cracks and breakage in shipping and assembly and such devices are much less liable to be broken when in use.

Such constructions of course are subject to considerable vibration or shock and severe stresses which are created between adjacent bars by the result of short circuiting in the system, but damage caused thereby is minimized.

It has been found by the use of this type of support that the bus bars can be placed much closer together than formerly. In fact the completed assembly may be reduced in size as much as 30% in width thus saving material in use and cost of housing material. The closer spacing also ensures lower reactance.

The elastomeric material acts to bleed off the heat from the bus bars and ensures maintenance of the system at a safe temperature. As indicated above the material is compressed on the bus bars whereby a good heat conducting relation is established between the material and the bus bars.

We claim:

1. In a bus bar duct system, a housing duct, a plurality of flat bus bars arranged in flatwise parallel spaced relation within said housing duct, supporting means for said bus bars comprising two complementary members formed of elastomeric material extending transversely across the edges of said bus bars and creating longitudinal duct ventilation passages by said members being spaced from the walls of said housing duct, said members being provided with a plurality of transverse grooves in their adjacent sides for the bus bars, said transverse grooves having a depth substantially equal to one-half the width of said bus bars so as to provide spacing portions of elastomeric material on said members between said bus bars and on the outer sides of the two outer bus bars, a movable post at each end of said members each having a planar surface extending parallel to the sides of said bus bars, means for drawing said posts toward each other causing compression of the members between said bus bars, the compressive force causing said groove surfaces of said members to be compressed into intimate support and heat conducting contact longitudinally with the sides of said bus bars giving support rigidity for said bus bars, and said compression causing means retaining said members' spaced relationship from said housing walls while said members are in the compressed state.

2. In a bus bar duct system, a housing duct, a plurality of flat bus bars arranged in flatwise parallel spaced relation within said housing duct, supporting means for said bus bars comprising two complementary clamping members formed of elastomeric material extending transversely across the edges of said bus bars and creating longitudinal ventilation passages by said clamping members being spaced from the walls of said housing duct, said members being provided with a plurality of transverse grooves in their adjacent sides for the bus bars and having each a longitudinal groove in its opposite side, said transverse grooves having a depth substantially equal to one-half the width of said bus bars so as to provide spacing portions of elastomeric material on said members between said bus bars and on the outer sides of the two outer bus bars, an end post at each end of said clamping members each having a planar portion extending parallel to the side of said bus bars, and clamping rods in said longitudinal grooves extending through apertures in said end posts for drawing said end posts against the ends of said clamping members thereby to cause compression of the members between said bus bars, the compressive force causing said groove surfaces of said members to be compressed into intimate support and heat conducting contact longitudinally with the sides of said bus bars giving support rigidity for said bus bars, the said clamping rods retaining said members' spaced relationship from said housing walls while said members are in the compressed state.

References Cited in the file of this patent

UNITED STATES PATENTS

| | | |
|---|---|---|
| 1,851,940 | Williams | Mar. 29, 1932 |
| 1,965,182 | Gerlach et al. | July 3, 1934 |
| 2,039,025 | Papst | Apr. 28, 1936 |
| 2,146,812 | Frank | Feb. 14, 1939 |
| 2,186,377 | Frank | Jan. 9, 1940 |
| 2,310,919 | Adam | Feb. 16, 1943 |
| 2,550,112 | Fields | Apr. 24, 1951 |
| 2,576,774 | Carlson | Nov. 27, 1951 |